United States Patent
Brown et al.

(10) Patent No.: US 8,639,290 B2
(45) Date of Patent: Jan. 28, 2014

(54) UICC CONTROL OVER DEVICES USED TO OBTAIN SERVICE

(75) Inventors: Jason Brown, Round Rock, TX (US); Inderpreet Singh Ahluwalia, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 321 days.

(21) Appl. No.: 12/567,278

(22) Filed: Sep. 25, 2009

(65) Prior Publication Data

US 2011/0077051 A1 Mar. 31, 2011

(51) Int. Cl.
*H04B 1/38* (2006.01)

(52) U.S. Cl.
USPC .......................................... 455/558; 455/410

(58) Field of Classification Search
USPC ........................... 455/551, 558, 418, 419, 410
See application file for complete search history.

(56) References Cited

U.S. PATENT DOCUMENTS

| | | | |
|---|---|---|---|
| 5,629,975 A * | 5/1997 | Tiedemann et al. | 455/435.1 |
| 6,362,893 B1 | 3/2002 | Francis | |
| 6,463,537 B1 | 10/2002 | Tello | |
| 6,650,430 B2 | 11/2003 | Francis | |
| 6,862,684 B1 | 3/2005 | DiGiorgio | |
| 7,389,426 B2 * | 6/2008 | Bumiller et al. | 713/187 |
| 7,460,862 B2 * | 12/2008 | Pasanen et al. | 455/418 |
| 7,474,894 B2 * | 1/2009 | Cardina et al. | 455/432.3 |
| 2004/0266395 A1 * | 12/2004 | Pailles et al. | 455/411 |
| 2005/0008159 A1 | 1/2005 | Grilli | |
| 2005/0176464 A1 * | 8/2005 | Portasany Sanchez | 455/558 |
| 2005/0239504 A1 * | 10/2005 | Ishii et al. | 455/558 |
| 2007/0060106 A1 * | 3/2007 | Haverinen et al. | 455/410 |
| 2008/0254834 A1 | 10/2008 | Liu | |
| 2009/0199001 A1 | 8/2009 | Barriga | |
| 2009/0209232 A1 | 8/2009 | Cha | |
| 2009/0305668 A1 * | 12/2009 | Ahn et al. | 455/410 |

* cited by examiner

*Primary Examiner* — Raymond Dean
(74) *Attorney, Agent, or Firm* — Hartman & Citrin LLC

(57) ABSTRACT

Devices and methods are disclosed by which a smart card or UICC that is removably insertable into a wireless terminal will only allow operation in either a specific terminal or a specific set of terminals. A mechanism to restrict the set of terminals that a UICC will operate with based upon logic embedded in a memory within the UICC. The UICC receives specific information from the wireless terminal when the terminal is turned on. If the information received satisfies a plurality of rules or conditions stored within the UICC, the UICC functions normally and the terminal may be registered with the network. If the UICC is inserted in an unsupported terminal, the UICC will refuse to function normally. This provides a deterrent against UICC theft.

18 Claims, 3 Drawing Sheets

UICC CONTROL OVER DEVICES USED TO OBTAIN SERVICE

BACKGROUND OF THE INVENTION

1. Field of the Invention

The present invention relates to wireless networks. Specifically, the present invention relates to restricting the use of a Universal Integrated Circuit Card (UICC) to a specific wireless terminal or specific set of wireless terminals.

2. Background of the Invention

Restricting the use of a cellular or wireless terminal to a particular purpose or application is a useful feature that has yet to be optimized. Typically, a wireless terminal registers itself on a wireless network when the power is turned on. A smart card, such as a Subscriber Identity Module (SIM) card, inserted inside the terminal contains registration files that enable the terminal to register with the network. For wireless networks such as Global System for Mobile Communications (GSM), Universal Mobile Telecommunications System (UMTS), or Long Term Evolution (LTE), the SIM is just one component of several other modules within a Universal Integrated Circuit Card (UICC). The UICC is inserted into the terminal, the terminal is powered on, and registration information such as an international mobile subscriber identity (IMSI), location information (LOCI) or "location identifier", account information, device information, etc. is used to register the terminal with the wireless network, thereby enabling the use of services offered by the network.

There are several situations where an unauthorized user may be able to remove the smart card or UICC from an unmonitored wireless terminal, and insert it into another wireless terminal for personal use. This is typically the case when the original terminal with the UICC is not a personal one. For instance, wireless terminals are increasingly being used today in several situations other than for voice conversations or personal use. Enterprise GSM, UMTS, or LTE devices can be used for remote monitoring and reporting. Remote security systems monitor safety, environmental, and security conditions, and can wirelessly report results back to a central monitoring station. Some wireless services or rate plans are purposely tied to specific devices and/or types of devices. For example, data access via a laptop and PC card may be charged differently than data access via a handset. Wireless carriers sometimes donate fixed wireless devices to natural disaster victims at no cost, under the stipulation that the embedded UICC only be used in the provided terminal and not in a standard handset. If the UICC is stolen and inserted in a regular handset, additional costs of monitoring and enforcement are imposed upon the wireless carrier or service provider.

What is needed is a security feature to prevent unauthorized use of the smart card or UICC within unsupported terminals.

SUMMARY OF THE INVENTION

The present invention provides devices and methods by which the UICC will only allow operation in either a specific device or a specific set of devices. The following disclosure provides a mechanism to restrict the set of devices that a UICC will operate with based upon logic embedded in a memory within the UICC. The UICC receives specific information from the terminal when the terminal is turned on. If the information received satisfies a plurality of rules or conditions stored within the UICC, then the UICC functions normally and the terminal may be registered with the network. If the UICC is inserted in an unsupported handset, then the UICC will refuse to function normally. This provides a deterrent against UICC theft.

In one exemplary embodiment, the present invention is a device removably adapted to be coupled to a wireless terminal on a wireless network. The device includes a first processor, a first memory, and a logic unit stored on the first memory programmed to enable the first processor to receive a plurality of attributes from the wireless terminal, to determine that plurality of attributes corresponds to a plurality of rules stored on the first memory, and to enable registration of the wireless terminal with the wireless network.

The device further comprises a plurality of network access files stored on the first memory. The network access files include any combination of at least a unique user identifier and a location identifier for the wireless terminal. The network access files may initially be in a deactivated state, wherein the logic unit enables registration of the wireless terminal with the wireless network by activating the network registration files. Alternatively, the network access files are initially in an activated state, and wherein the logic unit enables registration of the wireless terminal with the wireless network by allowing the network access files to remain in an activated state.

In another exemplary embodiment, the present invention is a method for registering a wireless terminal with a wireless network. The method includes receiving a plurality of attributes of the wireless terminal, determining that the plurality of attributes corresponds to a plurality of rules stored on a memory within a smart card coupled to the wireless terminal, and registering the wireless terminal with the wireless network. Registering the wireless terminal with the wireless network further comprises activating a plurality of network access files stored on the memory within the smart card. The plurality of network files includes any combination of at least a unique user identifier and a location identifier for the cellular telephone.

DETAILED DESCRIPTION OF THE INVENTION

Figure 1:
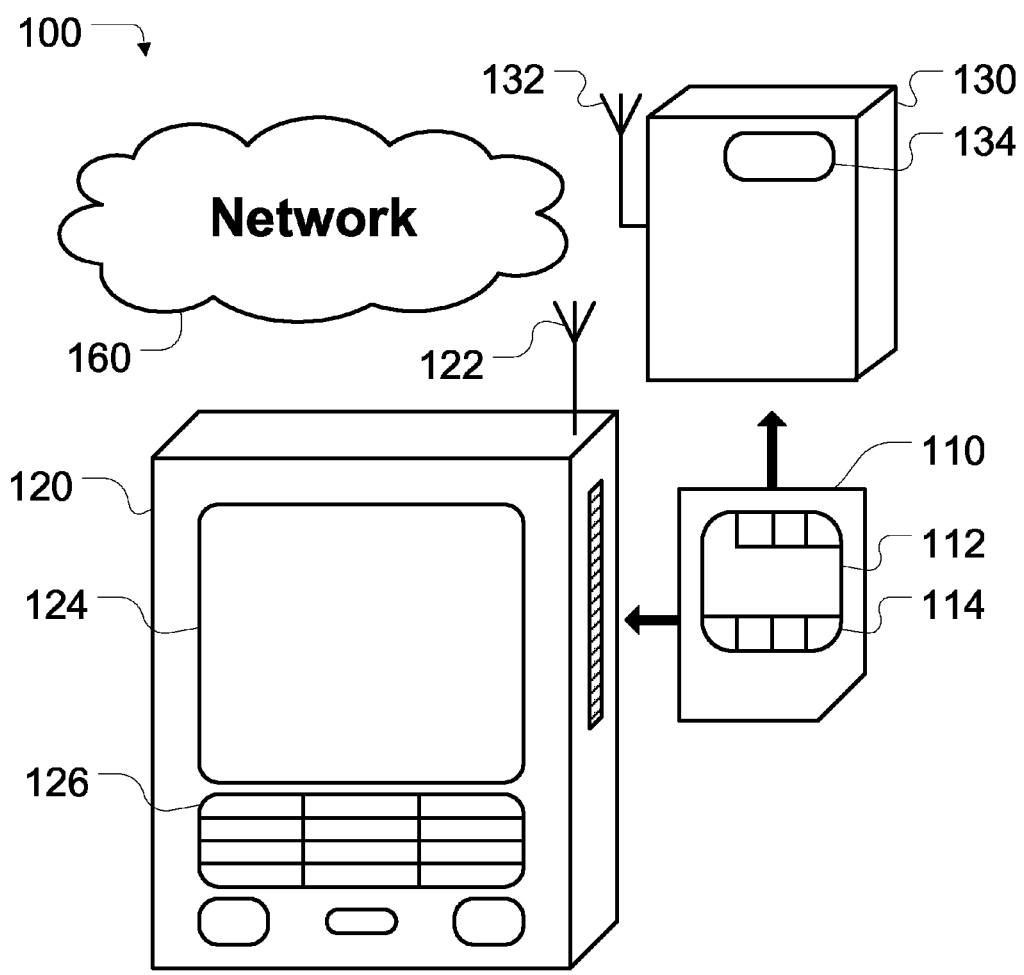
FIG. 1 shows a system for registering a wireless terminal with a network, according to an exemplary embodiment of the present invention.

The following disclosure describes devices, systems, and methods to enable or disable registration of a wireless terminal with a wireless network. A device such as a smart card is removably coupled to a wireless terminal having a plurality of attributes. The device includes a memory storing a plurality of rules or conditions. If the plurality of attributes of the wireless terminal matches the plurality of rules or satisfies the plurality of conditions, the device enables registration of the wireless terminal with the wireless network. Consequently, insertion of the device into a wireless terminal that does not possess the requisite attributes will cause the device to disable registration with the wireless network.

A "smart card device," as used herein and throughout this disclosure, refers to any combination of a processor and at least one memory that is removably insertable into or adapted to be coupled to a wireless terminal. An example of a smart card device in this case would be a smart card such as a UICC. A UICC may contain several applications, making it possible for the same smart card to give access to both GSM and UMTS networks, and also provide storage of an address book and other applications. For instance, for access to a GSM, UMTS or LTE network, the UICC contains a SIM and/or USIM application. For access to a CDMA network, the UICC contains a CSIM application, in addition to 3GPP USIM and SIM applications. A UICC with all 3 features is called a removable user identity card, or R-UIM. An R-UIM card can be inserted into CDMA, GSM, or UMTS handsets, and will work in all three cases.

Within a smart card device, a processor refers to a CPU embedded on a single or multiple integrated circuits. The processor may include logic embedded into it, and may additionally be coupled to a data storage or memory. Memory includes but is not limited to RAM, ROM, EEPROM, and equivalents. The memory stores additional software programs or logic containing instructions to be executed by the processor.

For the purposes of the present disclosure, a smart card device must be distinguished from a wireless terminal. A wireless terminal may include one or more smart card devices, however, the wireless terminal also includes its own processor, memory, and other components. An example of a wireless terminal is a cellular telephone. Another example is a fixed wireless terminal, which differs from conventional handsets operating within cellular networks in that a fixed wireless terminal or desk telephone will be limited to an almost permanent location with almost no roaming abilities. Examples include a "last-mile" modem or a sensor that communicates its readings over a wireless network. Other examples of wireless terminals will be apparent to one skilled in the art.

Wireless terminals include transceivers that allow them to utilize services offered by wireless networks, such as radio resources, packet-based services, and enhanced services such as AGPS, push-to-talk, etc. Wireless terminals gain access to services by registering on the wireless network. Registration includes authentication, location updating, and handovers. Registration is typically performed via the smart card that is removably coupled to the wireless terminal, which stores a unique number associated with the GSM or UMTS user, for instance, an International Mobile Subscriber Identity (IMSI) or a Temporary Mobile Subscriber Identity (TMSI), each of which can be termed a "unique user identifier." In addition, the GSM, UMTS, or LTE registration process updates elements on the network with a location of the wireless terminal using location information (LOCI). The identities and location information are collectively referred to as registration files and are stored on the smart card device.

FIG. 1 shows a system 100 for registering a wireless terminal with a network 160. System 100 includes a smart card device in the form of a UICC or smart card 110, further comprising a processor 112 and memory 114. Wireless terminal 120 is a typical cellular telephone or handset, and includes an antenna 122 for communicating with network 160, a display 124, and a keypad 126. Handset 120 also includes a processor and memory. Wireless terminal 130 is a fixed wireless terminal, i.e. it communicates over the cellular network but is tied to a particular location and does not utilize roaming or equivalent services. Fixed wireless terminal 130 also includes antenna 132, and a display 134. In one embodiment, display 134 is a status indicator, showing whether or not terminal 130 is connected to network 160. Display 134 can also indicate the quality of the connection and/or error messages. Network 160 is any wireless network such as a GSM, UMTS, CDMA, or equivalent wide-area-network, and includes several elements that are not shown, such as a Base Stations Subsystem (BSS), Mobile Switching Centers (MSC), gateways, proxy servers, authentication servers, and application servers. Network 160 also includes databases such as a Home Location Register (HLR), which contains all the administrative information of each subscriber registered in the corresponding GSM network, along with the current location of the subscriber, an Equipment Identity Register (EIR), which contains a list of all valid mobile equipment on the network, where each mobile equipment is identified by its International Mobile Equipment Identity (IMEI), and an Authentication Center (AuC), which is a protected database that stores a copy of the secret key stored in each subscriber's SIM or UICC card 110.

According to an exemplary embodiment of the present invention, smart card 110 enables wireless terminals 120 and 130 to register with network 160 so that they can avail of the services offered by network 160. Memory 114 within smart card 110 is programmed with a plurality of rules or conditions that have to be satisfied before registration is enabled. This determination takes place when smart card 110 receives information about the attributes of wireless terminal 120 or 130. The attributes received from the wireless terminal are correlated with the rules or conditions within memory 114, and if the conditions are satisfied, then processor 112 allows registration to occur. This process is described in further detail with regards to FIGS. 2 and 3.

The attributes of wireless terminals 120/130 include but are not limited to: an International Mobile Equipment Identity (IMEI or IMEISV), which is a number unique to every wireless terminal, as well as some satellite phones. The IMEI number is used by a GSM, UMTS and LTE network to identify valid terminals, however, it should be noted that the IMEI number is only used to identify the terminal, and has no relation to the subscriber. Instead, the subscriber is identified by transmission of an IMSI number, which is stored on a SIM module within smart card 110. Other attributes of a wireless terminal include a software/firmware version of wireless terminals 120/130, the type of terminal, and the services enabled on the terminal. Examples of types of terminals range from personal handsets to fixed wireless terminals, and can also include PC Cards, USB modems, smartphones, in-vehicle navigation systems, car telephones, telemetry systems, etc. There are several methods of transmitting attributes to the smart card 110. For instance, mobile terminals 120/130 can be programmed with logic on the memory to submit the attributes every time the terminal is powered on. Correspondingly, logic within smart card 110 awaits receipt of these attributes before beginning the registration process. Attributes may be submitted via an ENVELOPE command. Alternatively, terminals 120/130 are programmed to update logical files on memory 114, wherein the logical files are updated to reflect the attributes of the wireless terminal in which smart card 110 is inserted. Other methods for collecting the attributes will be apparent to one skilled in the art.

In one exemplary embodiment, terminal 120 is a handset, such as a cellular telephone, and terminal 130 is a fixed wireless terminal. Consequently, each terminal has a different set of attributes. The plurality of rules stored in memory 114 may require that any wireless terminal coupled to smart card 110 must be enabled for data access. If the transceivers (not shown) within each terminal 120/130 are able to receive data packets from network 160 via antennae 122/132, then the smart card allows registration of either terminal. For instance, when smart card 110 is inserted into either terminal 120 or 130, the rule which states that the terminal must be equipped to receive data packets is satisfied, and smart card 110 enables registration of either terminal with the network.

In another exemplary embodiment, smart card 110 is programmed to allow registration only for fixed wireless terminals. For instance, the rule may state that any wireless terminal with a roaming capability, such as cellular handset 120, that is coupled to smart card 110 will be inhibited from registering with network 160. Consequently, when smart card 110 is inserted into terminal 120 and terminal 120 is powered, terminal 120 submits its attributes to smart card 110, processor 112 compares the attributes to the rules, determines that terminal 120 is not authorized, and prohibits registration with the network 160. Enabling/inhibiting registration is further described with respect to FIGS. 2 and 3, but generally includes disabling access to the IMSI and LOCI network registration files stored on memory 114. Consequently, an unauthorized terminal cannot work with smart card 110.

Figure 2:
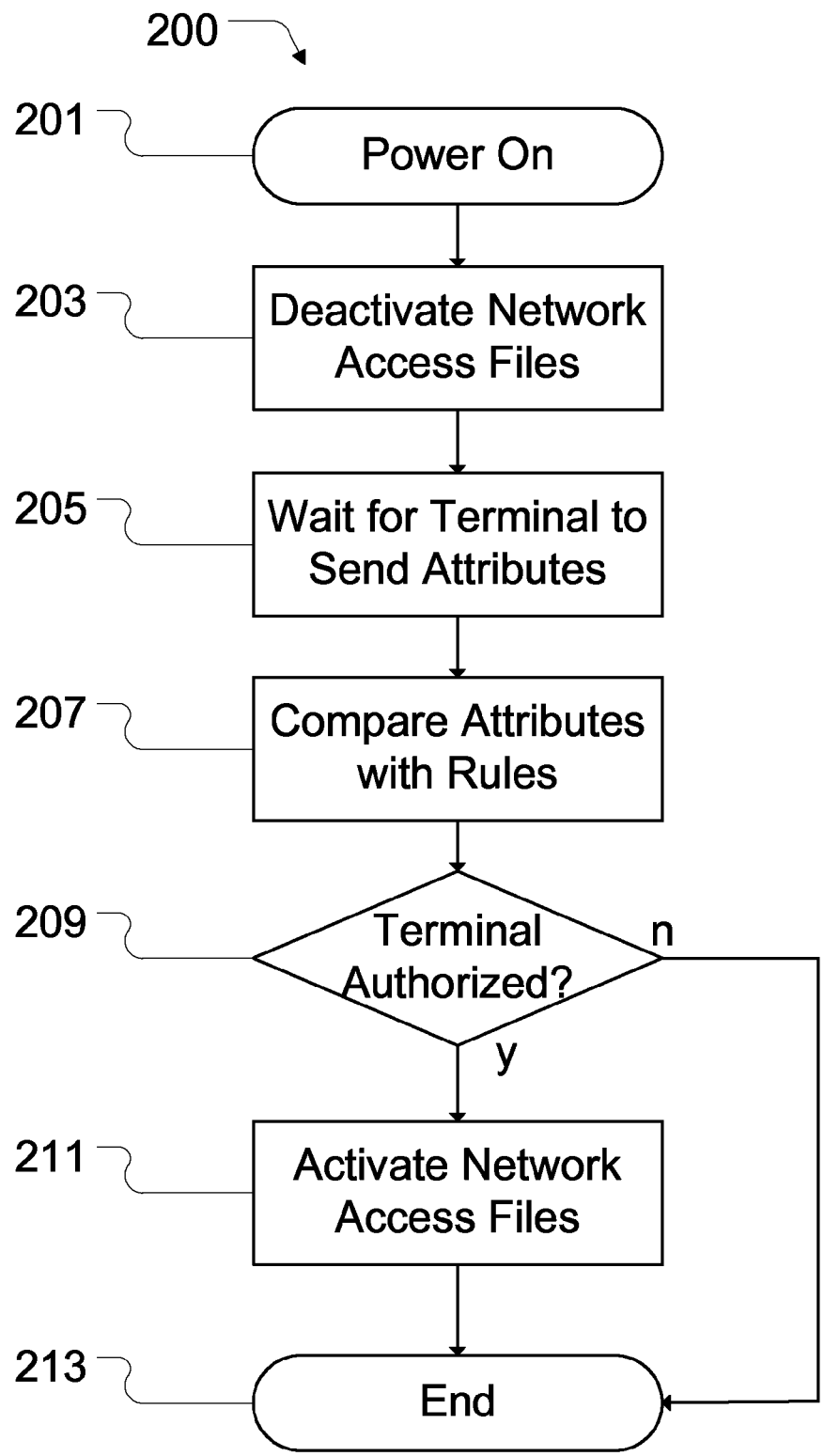
FIG. 2 shows a method for enabling registration of a wireless terminal with a network, according to an exemplary embodiment of the present invention.

FIG. 2 shows a method 200 for enabling registration of a wireless terminal with a network, according to an exemplary embodiment of the present invention. At power up (201), a smart card device such as smart card 110 automatically disables or deactivates (203) network access files such as the IMSI and LOCI files, so that a wireless terminal that the smart card device is coupled with cannot read these files. Several methods of deactivating these files will be apparent to one skilled in the art, such as changing the permissions on the file, or hiding the files from view. Consequently, the terminal cannot register itself with the network until it transmits a plurality of attributes of the terminal (205) to the smart card device. As described before, the terminal can be programmed to transmit the attributes, or the smart card device can be programmed to request the attributes from the terminal. In either case, once the attributes are received, logic within the smart card device compares the attributes with the rules or conditions stored on the memory on the smart card device (207). If the attributes match the rules, the wireless terminal is considered as being authorized to access the network (209). Logic within the smart card device activates the network access files (211), for instance by enabling access to IMSI and LOCI files by the terminal. This allows the terminal to register itself with the network. If the attributes of the terminal are not authorized by the rules (209), the network access files remain in a deactivated state, and the terminal is unable to access the services offered by the network.

It is important to note that before any attributes are compared to the rules, the attributes must be received at the smart card device. If no attributes are received, the smart card device continues to wait (205). Consequently, any legacy terminals that are not programmed to submit attributes to the smart card device are unable to register with the network until the legacy terminal is programmed with a software update to transmit its attributes to the smart card device. This feature discourages thieves from decoupling the smart card device from an authorized terminal and inserting it into a legacy wireless terminal that is not authorized by the network operator or service provider.

As mentioned herein, there are several rules or conditions that can be programmed, based upon the requirements of the network operator or service provider. For instance, the smart card device may be restricted to enable registration only on fixed wireless terminals. Consequently, insertion of the smart card device into a regular wireless terminal would disable registration of the terminal with the network. Alternatively, a rule could encompass a specific terminal or set of terminals, based upon the IMEI of the terminal. This can also allow for ranges of IMEI to be enabled for registration, such that a particular smart card device only allows registration for a series of terminals issued for a particular purpose, such as a set of terminals donated to hurricane victims, or a set of terminals given to employees of a corporation. In another exemplary embodiment, a smart card device is configured to enable network registration only for those terminals that can avail themselves of a particular service or application. For instance, only terminals having AGPS capabilities (i.e., a GPS receiver coupled with a transceiver equipped to receive packet-based assistance data) would be allowed to register with the network. Consequently, when the smart card device is inserted into a terminal, it receives attributes from the terminal, compares the attributes to the programmed AGPS rule, and determines whether or not to allow registration with the network based on the attributes.

The present invention also allows for complexity of rules/conditions. A smart card device may allow registration with certain but not all elements of an operator's network. For instance, a GSM network may include Location Based Services (LBS), as well as Media Servers (MS), GPS servers, and a standard voice channel. Depending on the attributes of the wireless terminal, a UICC/smart card may allow registration with only certain specific elements of the network, and disable registration for other services. Moreover, combinations of rules can be used to enable or disable registration. A wireless terminal that is fixed AND that has a GPS receiver will be allowed access to network registration files, whereas all other wireless terminals will be denied access to network registration files. Consequently, a network operator can fine-tune the type and number of terminals that are authorized to access the operator's network. An authorized terminal is allowed network access when the UICC activates the network registration files in question, and unauthorized terminals may be presented with an error message.

Figure 3:
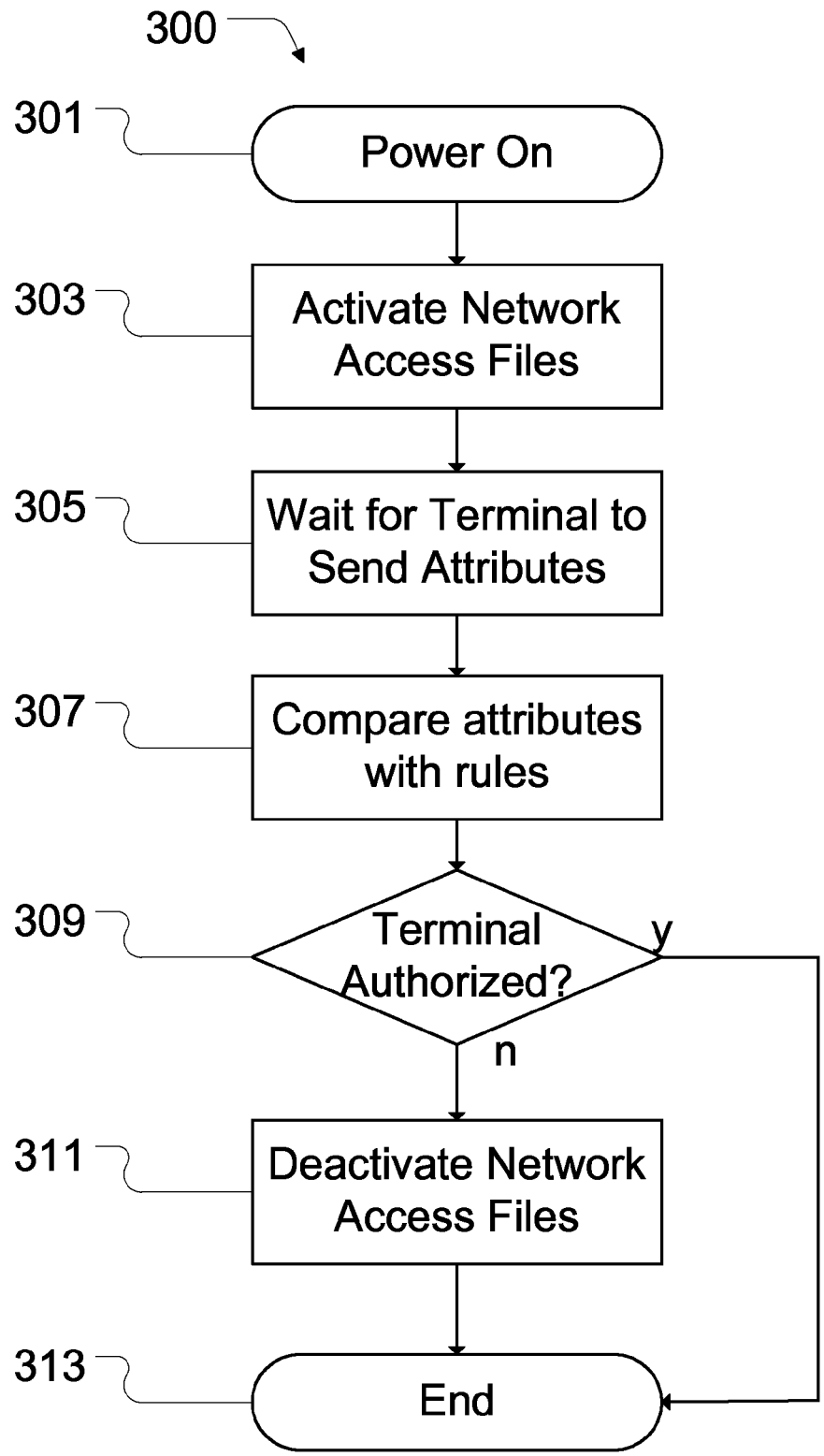
FIG. 3 shows an alternative method for enabling registration of a wireless terminal with a network, according to another exemplary embodiment of the present invention.

FIG. 3 shows an alternative method 300 for enabling registration of a wireless terminal with a network, according to an exemplary embodiment of the present invention. The difference between this method and that of FIG. 2 is that in this case, at power up (301), the smart card automatically activates (303) network access files such as the IMSI and LOCI files. The smart card then waits (305) for the terminal to submit attributes. As described before, the terminal can be programmed to transmit the attributes, or the smart card device can be programmed to request the attributes from the terminal. In either case, once the attributes are received, logic within the smart card device compares the attributes with the rules or conditions stored on the memory on the smart card device (307). If the attributes match the rules, then the wireless terminal is considered as being authorized to access the network (309). For instance, the attributes may indicate that the terminal is able to support a particular service or feature, such as AGPS. Consequently, the network access files remain in an activated state, and can be read by the terminal during the registration process. On the other hand, if the attributes of the terminal are not authorized by the rules, i.e. if they do not support a particular application or service, then the logic within the smart card device deactivates the network access files (311), for instance by disabling access to IMSI and LOCI files by the terminal. Consequently, the terminal is unable to access the services offered by the network. Therefore, the UICC always activates the files needed for network access each time it is reset, but only invalidates them if the terminal fails to indicate its support of the particular service/feature.

The present invention is an efficient low-cost solution that involves only minor changes to both the terminal and UICC.

It is also implemented in a flexible and scalable manner by using existing network elements and existing proprietary communication formats.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A smart card device comprising:
   a smart card processor; and
   a smart card memory that stores a plurality of network access files and logic that, when executed by the smart card processor, causes the smart card processor to perform operations comprising
      deactivating, by the smart card processor, the plurality of network access files in response to detecting powering on of a wireless terminal connected to the smart card device, wherein deactivating the plurality of network access files comprises preventing the wireless terminal connected to the smart card device from reading the plurality of network access files,
      receiving, by the smart card processor, a plurality of attributes from the wireless terminal having a transceiver, the plurality of attributes comprising an attribute that specifies an ability of the transceiver to receive a data packet,
      comparing, by the smart card processor, the plurality of attributes with a plurality of rules stored on the smart card memory, the plurality of rules comprising a rule that requires the wireless terminal to comprise a transceiver capable of receiving the data packet, and
      in response to determining that the attribute matches the rule, activating, by the smart card processor, the plurality of network access files to enable registration of the wireless terminal with a wireless network, wherein activating the plurality of network access files comprises allowing the wireless terminal connected to the smart card device to read the plurality of network access files.

2. The smart card device of claim 1, wherein the plurality of network access files comprises a unique user identifier for the wireless terminal and a location identifier for the wireless terminal.

3. The smart card device of claim 1, wherein the plurality of attributes further comprises an international mobile equipment identity, a software version, a wireless terminal type, and a feature supported by the wireless terminal.

4. The smart card device of claim 3, wherein the plurality of attributes is received via an ENVELOPE command.

5. The smart card device of claim 3, wherein the logic, when executed by the processor, causes the processor to perform operations further comprising: updating a logical file on the smart card memory with the plurality of attributes received from the wireless terminal.

6. The smart card device of claim 1, wherein the wireless terminal comprises a fixed wireless terminal.

7. The smart card device of claim 1, wherein the smart card device comprises a universal integrated circuit card.

8. A method comprising:
   detecting, by a smart card processor of a smart card device comprising the smart card processor and a smart card memory, powering on of a wireless terminal connected to the smart card device;
   in response to detecting the powering on of the wireless terminal, deactivating, by the smart card processor, a plurality of network access files stored on the smart card memory, wherein deactivating the plurality of network access files comprises preventing the wireless terminal connected to the smart card device from reading the plurality of network access files;
   receiving, by the smart card processor, a plurality of attributes from the wireless terminal, the plurality of attributes comprising an attribute that specifies an ability of a transceiver of the mobile terminal to receive a data packet;
   comparing, by the smart card processor, the plurality of attributes with a plurality of rules stored on the smart card memory, the plurality of rules comprising a rule that requires the wireless terminal to comprise the transceiver; and
   in response to determining that the attribute matches the rule, activating, by the smart card processor, the network access files to enable registration, by the smart card processor, of the wireless terminal with a wireless network, wherein activating the plurality of network access files comprises allowing the wireless terminal connected to the smart card device to read the plurality of network access files.

9. The method of claim 8, wherein the plurality of network access files comprises a unique user identifier for the wireless terminal and a location identifier for the wireless terminal.

10. The method of claim 9, further comprising disabling the registration of the wireless terminal with the wireless network by deactivating the plurality of network access files.

11. The method of claim 8, wherein the plurality of attributes further comprises an international mobile equipment identity, a software version, a wireless terminal type, and a plurality of features supported by the wireless terminal.

12. The method of claim 11, wherein the smart card processor receives the plurality of attributes via an ENVELOPE command.

13. The method of claim 11, wherein receiving the plurality of attributes from the wireless terminal comprises updating a logical file on the memory.

14. A non-transitory computer readable medium comprising a logic that, when executed by a processor, causes the processor to perform operations comprising:
   detecting powering on of a wireless terminal comprising a transceiver;
   in response to detecting the powering on of the wireless terminal, deactivating a plurality of network access files, wherein deactivating the plurality of network access files comprises preventing the wireless terminal connected to a smart card device from reading the plurality of network access files;

receiving a plurality of attributes from the wireless terminal, the plurality of attributes comprising an attribute that specifies an ability of the transceiver to receive a data packet;

comparing the attribute to a rule of a plurality of rules stored on the smart card device comprising a smart card processor and a smart card memory, wherein the rule requires the wireless terminal to comprise the transceiver; and in response to determining that the attribute matches the rule, activating the network access files to enable registration of the wireless terminal with a wireless network, wherein activating the plurality of network access files comprises allowing the wireless terminal connected to the smart card device to read the plurality of network access files.

15. The non-transitory computer readable medium of claim 14, wherein the plurality of network access files comprise a unique user identifier for the wireless terminal and a location identifier for the wireless terminal.

16. The smart card device of claim 1, wherein the wireless terminal comprises a cellular telephone handset.

17. The smart card device of claim 1, wherein preventing the wireless terminal connected to the smart card device from reading the plurality of network access files comprises hiding the plurality of network access files from view.

18. The smart card device of claim 1, wherein preventing the wireless terminal connected to the smart card device from reading the plurality of network access files comprises changing permissions associated with the plurality of network access files.

* * * * *